US008775278B2

(12) United States Patent
Tarao

(10) Patent No.: US 8,775,278 B2
(45) Date of Patent: Jul. 8, 2014

(54) COMPUTER READABLE MEDIUM HAVING CONSUMABLES-USABILITY DETERMINATION PROGRAM, CONSUMABLES-USABILITY DETERMINATION SYSTEM AND METHOD USING THE CONSUMABLES-USABILITY DETERMINATION PROGRAM

(75) Inventor: Ryoko Tarao, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 665 days.

(21) Appl. No.: 12/968,568

(22) Filed: Dec. 15, 2010

(65) Prior Publication Data

US 2011/0158659 A1 Jun. 30, 2011

(30) Foreign Application Priority Data

Dec. 28, 2009 (JP) ................................ 2009-298295

(51) Int. Cl.
*G06Q 10/00* (2012.01)
*G03G 15/00* (2006.01)

(52) U.S. Cl.
USPC ................................. 705/28; 399/12; 399/24

(58) Field of Classification Search
None
See application file for complete search history.

(56) References Cited

U.S. PATENT DOCUMENTS

| | | | | |
|---|---|---|---|---|
| 6,312,106 | B1 * | 11/2001 | Walker | 347/50 |
| 6,488,352 | B1 * | 12/2002 | Helterline et al. | 347/19 |
| 7,433,065 | B2 * | 10/2008 | Phillips et al. | 358/1.14 |
| 7,434,053 | B2 * | 10/2008 | Parry et al. | 713/171 |
| 8,120,804 | B2 * | 2/2012 | Isobe et al. | 358/1.15 |
| 8,396,378 | B2 * | 3/2013 | You | 399/12 |

FOREIGN PATENT DOCUMENTS

| | | | |
|---|---|---|---|
| JP | 10-309851 | | 11/1998 |
| JP | 2004-303102 | A | 10/2004 |
| JP | 2004-312469 | A | 11/2004 |
| JP | 2005-186538 | A | 7/2005 |
| JP | 2005-267060 | | 9/2005 |
| JP | 2006-285456 | | 10/2006 |
| JP | 2007-041840 | | 2/2007 |
| JP | 2008-093968 | | 4/2008 |
| JP | 2008-186240 | A | 8/2008 |
| JP | 2009-208440 | A | 9/2009 |
| JP | 2009-294702 | A | 12/2009 |

OTHER PUBLICATIONS

JP Notification of Reasons for Refusal dated Oct. 20, 2011; corresponding Application No. 2009-298295; English Translation.

* cited by examiner

*Primary Examiner* — Asfand Sheikh
(74) *Attorney, Agent, or Firm* — Banner & Witcoff, Ltd.

(57) ABSTRACT

A computer readable medium has a consumables-usability determination program product stored thereon. The program product directs a portable terminal to perform as: a model-information inputting section for inputting model information indicating a model of an image forming apparatus; a consumables-information inputting section for inputting consumables information indicating consumables; a first determining section for determining whether the consumables indicated by the consumables information inputted by the consumables-information inputting section is usable to the model indicated by the model information inputted by the model-information inputting section; and a first reporting section for reporting a result determined by the first determining section to the user.

16 Claims, 11 Drawing Sheets

FIG.2

22

SERVER-SIDE CONSUMABLES TABLE

| INFORMATION CLASSIFICATION | CONSUMABLES INFORMATION | MODEL INFORMATION | | |
|---|---|---|---|---|
| | | MFC-xxx1 | MFC-xxxx2 | Photo-xxx |
| Toner/Ink | C-1111 | O | O | × |
| | M-1111 | O | O | × |
| | Y-1111 | O | O | × |
| | K-1111 | O | O | × |
| Toner/Ink | C-2222 | × | × | O |
| | M-2222 | × | × | O |
| | Y-2222 | × | × | O |
| | K-2222 | × | × | O |
| Toner/Ink | C-3333 | × | O | × |
| | M-3333 | × | O | × |
| | Y-3333 | × | O | × |
| | K-3333 | × | O | × |
| Media Size | A4 | O | O | × |
| | Letter | O | O | × |
| | Postcard | O | O | O |
| | A3 | O | × | × |
| | A5 | O | × | × |
| Media Type | Plain | O | O | × |
| | Thin | O | O | × |
| | Thick | O | O | × |
| | OHP | O | × | × |
| | Glossy | O | × | O |

LAST UPDATE DATE TABLE

| MODEL INFORMATION | LAST UPDATE DATE |
|---|---|
| MFC-xxx1 | 2008/8/05 |
| MFC-xxxx2 | 2009/5/13 |
| Photo-xxx | 2009/11/18 |

FIG.3

18

MODEL INFORMATION=MFC-xxxx2

MOBILE-PHONE-SIDE CONSUMABLES TABLE

| INFORMATION CLASSIFICATION | CONSUMABLES INFORMATION |
|---|---|
| Toner/Ink | C-1111 |
| | M-1111 |
| | Y-1111 |
| | K-1111 |
| Toner/Ink | C-3333 |
| | M-3333 |
| | Y-3333 |
| | K-3333 |
| Media Size | A4 |
| | Letter |
| | Postcard |
| Media Type | Plain |
| | Thin |
| | Glossy |

LAST UPDATE DATE = 2009/5/13

RESIDUAL-AMOUNT INFORMATION TABLE

| CONSUMABLES INFORMATION | RESIDUAL-AMOUNT INFORMATION (= [RESIDUAL AMOUNT]/[AMOUNT BEFORE START OF USE]) |
|---|---|
| C-1111 | 73% |
| M-1111 | 18% |
| Y-1111 | 42% |
| K-1111 | 6% |
| A4-Plain | 34% |
| Letter-Thin | 44% |
| Letter-Plain | 25% |

LAST OBTAIN DATE = 2009/5/18

COMPUTER READABLE MEDIUM HAVING CONSUMABLES-USABILITY DETERMINATION PROGRAM, CONSUMABLES-USABILITY DETERMINATION SYSTEM AND METHOD USING THE CONSUMABLES-USABILITY DETERMINATION PROGRAM

CROSS REFERENCE TO RELATED APPLICATION

This application claims priority from Japanese Patent Application No. 2009-298295 filed on Dec. 28, 2009. The entire content of this priority application is incorporated herein by reference.

TECHNICAL FIELD

The present invention relates to a computer readable medium having a consumables-usability determination program and a consumables-usability determination system and a method using the consumables-usability determination.

BACKGROUND

There is a known image forming apparatus that prints a form when the residual amount of consumables (such as ink) becomes not greater than a predetermined threshold value. The form contains consumables information such as an item number of the ink cartridge. The user then fills the ordering quantity in the form and places an order with the form.

SUMMARY

However, there is a case where the user purchases the consumables not by the order with the form but by directly going to a shop etc. In such a case, the user has to take photographic or handwriting notes of the item number of the consumables prior to going to the shop.

Thus, there is a need for a program and a system having the program whereby the consumables information can be obtained without taking the photographic or handwriting notes of the item number of the consumables prior to going to the shop.

An aspect of the present invention is a computer readable medium having a consumables-usability determination program product stored thereon. The program product directs a portable terminal to perform as: a model-information inputting section for inputting model information indicating a model of an image forming apparatus; a consumables-information inputting section for inputting consumables information indicating consumables; a first determining section for determining whether the consumables indicated by the consumables information inputted by the consumables-information inputting section is usable to the model indicated by the model information inputted by the model-information inputting section; and a first reporting section for reporting a result determined by the first determining section to the user.

BRIEF DESCRIPTION OF THE DRAWINGS

FIG. 2 is a schematic diagram illustrating information stored in a storage unit of a server;

FIG. 3 is a schematic diagram illustrating information stored in a storage unit of a mobile phone;

DETAILED DESCRIPTION

<First Illustrative Aspect>

A first illustrative aspect will be described with reference to FIGS. 1 through 9.

(1) Configuration of Consumables-usability Determination System

Figure 1:
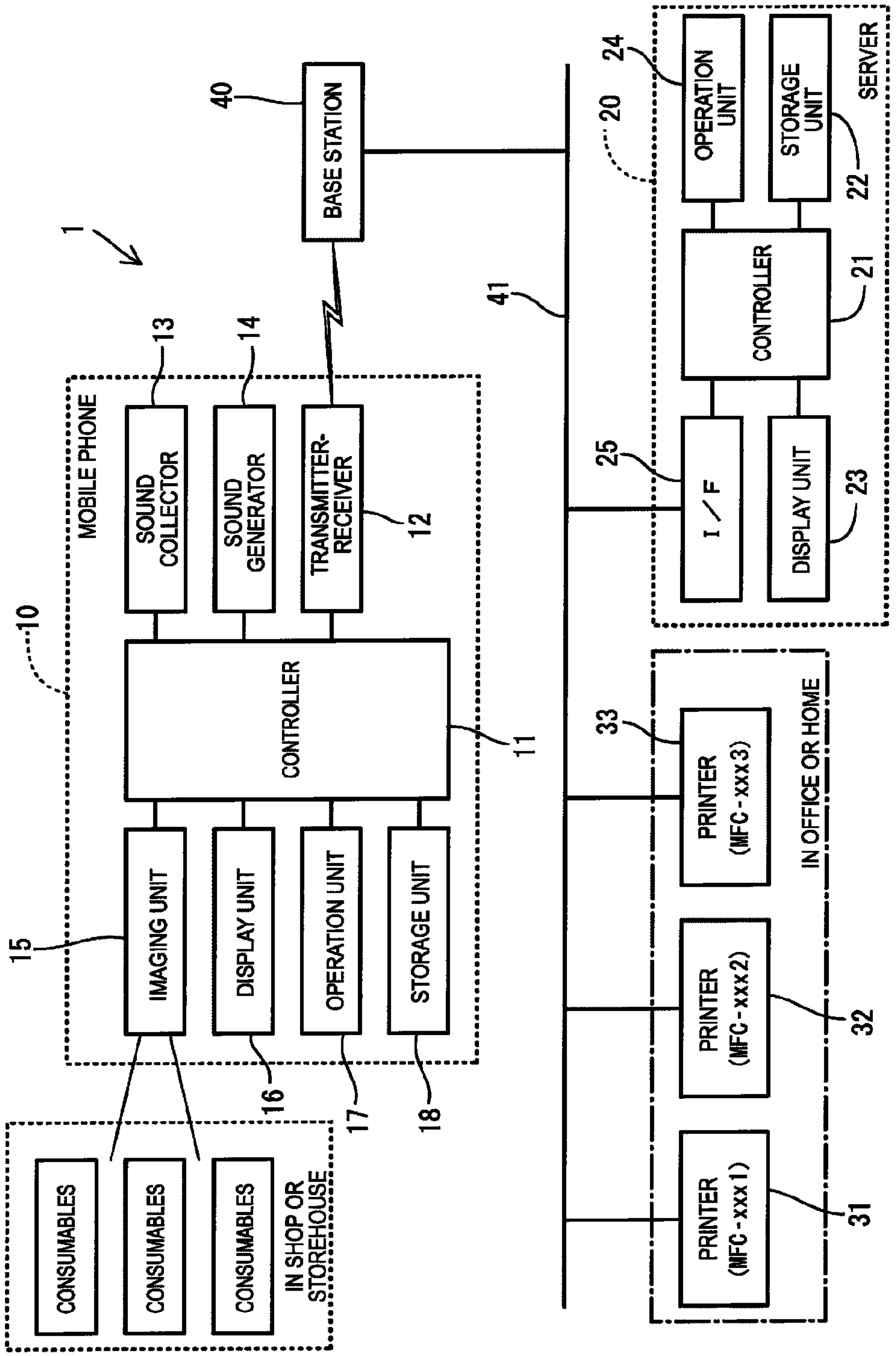
FIG. 1 is a block diagram illustrating configuration of a consumables-usability determination system of a first illustrative aspect.

As illustrated in FIG. 1, a consumables-usability determination system 1 includes a mobile phone 10 (an illustration of a portable terminal) and a server 20. The mobile phone 10 has a digital camera. The mobile phone 10 has a verbal communication function and, in addition, a data communication function so as to communicate data with the server 20 and printers 31, 32, 33 (each is an illustration of an image forming apparatus) through a base station 40 and a communication network 41.

(1-1) Electrical Configuration of Mobile Phone

The mobile phone 10 includes a controller 11, a transmitter-receiver 12, a sound collector 13, a sound generator 14, an imaging unit 15, a display unit 16, an operation unit 17, and a storage unit 18.

The controller 11 (an illustration of a first and second determining section) includes a CPU, a ROM, and a RAM. The CPU executes programs stored in the ROM and in the storage unit 18 so as to control components of the mobile phone 10. The ROM stores the programs, which the CPU executes, and data. The RAM is used as a main storage whereby the CPU executes processes.

The transmitter-receiver 12 (an illustration of an obtaining section, an updating section, and a residual-amount information obtaining section) includes an antenna, a transmitter, and a receiver. The transmitter-receiver 12 performs wireless communication with the base station 40.

The sound collector 13 includes a microphone for collecting voice.

The sound generator 14 includes a speaker for generating voice.

The imaging unit 15 (an illustration of a model-information inputting section and a consumables-information inputting section) includes an area image sensor, an optical system, an analogue front end (AFE), and an image processor. Upon push of a shutter button, the imaging unit 15 images the subject and creates a digital image.

The display unit 16 (an illustration of a first and second reporting section) includes a liquid crystal display and a drive circuit for driving the liquid crystal display. The display unit 16 displays information.

The operation unit 17 includes buttons (such as number buttons, a call button, and a shutter button) whereby the user operates the mobile phone 10.

The storage unit 18 (an illustration of a storing section and a terminal-side storing section) is an external storage unit that stores data with a non-volatile data carrier such as a flush memory. The storage unit 18 stores an operating system (OS), a mobile-phone-side determination program (an illustration of a consumables-usability determination program), etc. Furthermore, the storage unit 18 can store information (such as model information, a mobile-phone-side consumables table, and a last update date of consumables information).

(1-2) Electrical Configuration of Server

The server 20 includes a controller 21, a storage unit 22, a display unit 23, an operation unit 24, and a network interface (I/F) 25.

The controller 21 (an illustration of a deciding section) includes a CPU, a ROM, and a RAM. The CPU executes programs stored in the ROM and in the storage unit 22 so as to control components of the server 20. The ROM stores programs, which the CPU executes, and data. The RAM is used as a main storage wherewith the CPU executes processes.

The storage unit 22 (an illustration of a server-side storing section) is an external storage unit that stores programs and data with a non-volatile data carrier (such as a hard disk or a flush memory). The storage unit 22 stores an operating system (OS), a server-side determination program, and information such as a server-side consumables table and a last update date table.

The display unit 23 includes a display (such as a CRT or a liquid crystal display).

The operation unit 24 includes an input device (such as a mouse and a keyboard).

The I/F 25 (an illustration of a transmitting section) is connected to external apparatuses (such as the mobile phone 10 and the printers 31, 32, 33) through the communication network 41.

(1-3) Printer

Consumables (such as toner, ink, and a recording medium) are installed in each of the printers 31, 32, 33. Each printer 31, 32, 33 forms an image with the consumables.

The printer 31(32, 33) has a status monitoring function to detect residual amount of each of the consumables. On receipt of inquiry from an external apparatus about the residual amount of the consumables, the printer 31 (32, 33) detects the residual amount of the consumables, associates the consumables information indicating the consumables with residual-amount information indicating the residual amount of the consumables, and replies to the external apparatus. Note that the consumables information is an item number (for toner or ink) or a size and type of material (for a recording medium).

(2) Information Utilized by Consumables-usability Determination System

FIG. 2 is a schematic diagram showing an illustration of the information utilized by the consumables-usability determination system. The information illustrated in FIG. 2 is stored in the storage unit 22. In the storage unit 22, the server-side consumables table and the last update date table are stored.

FIG. 2 shows an illustrative concept of the server-side consumables table. In the table, the model information and the consumables information (with information classification) indicating consumables usable to a printer of a model indicated by the model information are registered in association with each other with respect to each printer model.

The model information indicates a model name.

The information classification indicates classification of the information indicated by the consumables information. For example: "Toner/Ink" indicates that the consumables information indicates the item number of toner or ink; "Media size" and "Media Type" indicate that the consumables information indicates the item type of recording medium. The item type of recording medium includes the "Media Size", which indicates the size, and the "Media Type", which indicates the type of material.

The consumables information indicates: the item number if the information classification is the "Toner/Ink"; the size of the recording medium if the information classification is the "Media Size"; and the type of material of the recording medium if the information classification is "Media Type". The initial character of the item number of the toner or ink indicates a color of the ink, such that "C" indicates cyan, "M" indicates magenta, "Y" indicates yellow, and "K" indicates black.

Each circle ("o")/cross ("x") in the table indicates the usability of the consumables indicated by the consumables information with respect to each printer model information. Specifically: "o" indicates that the consumables indicated by the consumables information in the same line is usable to the model indicated by the model information of the same column; and "x" indicates that the consumables is unusable to the model.

In the last update date table, the last update date of the consumables information is registered in a year-month-day format with respect to each model information.

FIG. 3 is a schematic diagram showing an illustration of the information utilized by the consumables-usability determination system. The information illustrated in FIG. 3 is stored in the storage unit 18 of the mobile phone 10. In the storage unit 18 of the mobile phone 10, the model information, the mobile-phone-side consumables table, the last update date, a residual-amount information table, and a last obtain date are stored.

The model information indicates the model name of the printer in which the consumables the user is going to replace is installed. The model information is inputted by the user.

The mobile-phone-side consumables table is a table in which the consumables information with the information classification is registered. The table is registered by obtaining the consumables information (with the information classification) about the consumables usable to the printer of the model indicated by the model information.

The last update date is the date obtained from the last update date table in the server 20. The last update date is the date (in the year-month-date format) stored in the last update date table at the time of obtaining the consumables information with the information classification from the server-side consumables table.

The residual-amount information table is a table in which the residual-amount information indicating the residual amount of each consumables in the printer that is being replaced is registered. Furthermore, the last obtain date is the date (in the year-month-date format) of obtaining the residual-amount information table from the printer.

Figure 4:
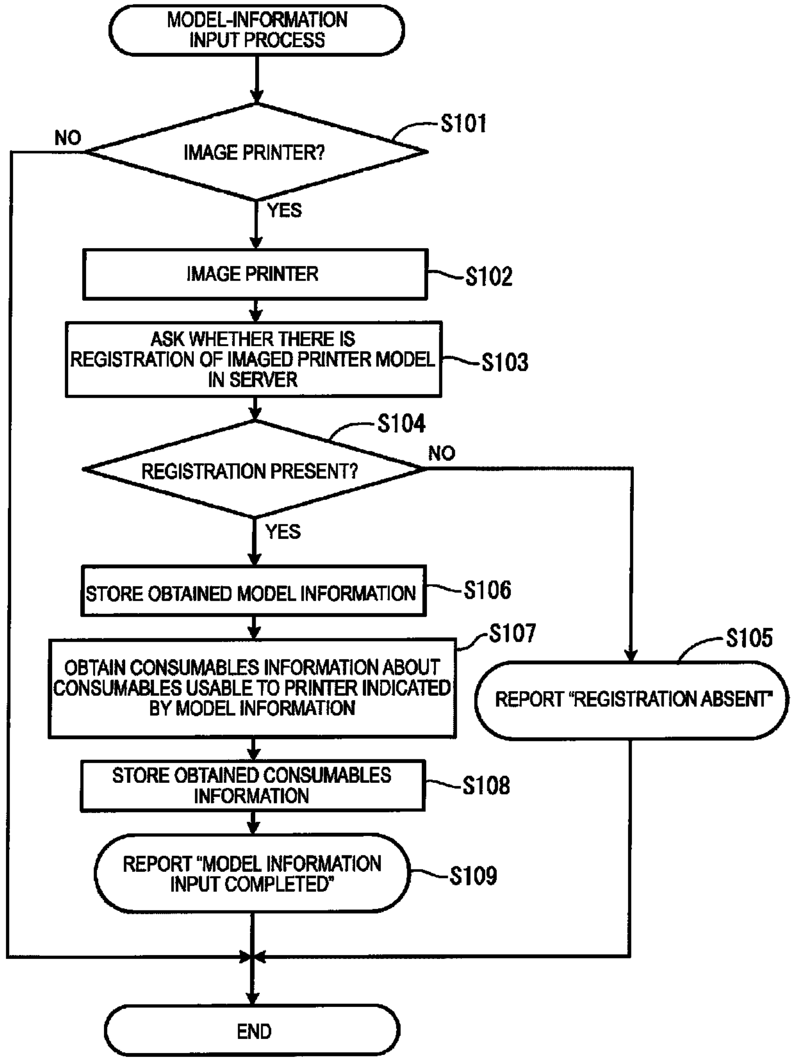
FIG. 4 is a flowchart of a model-information input process.
Figure 5:
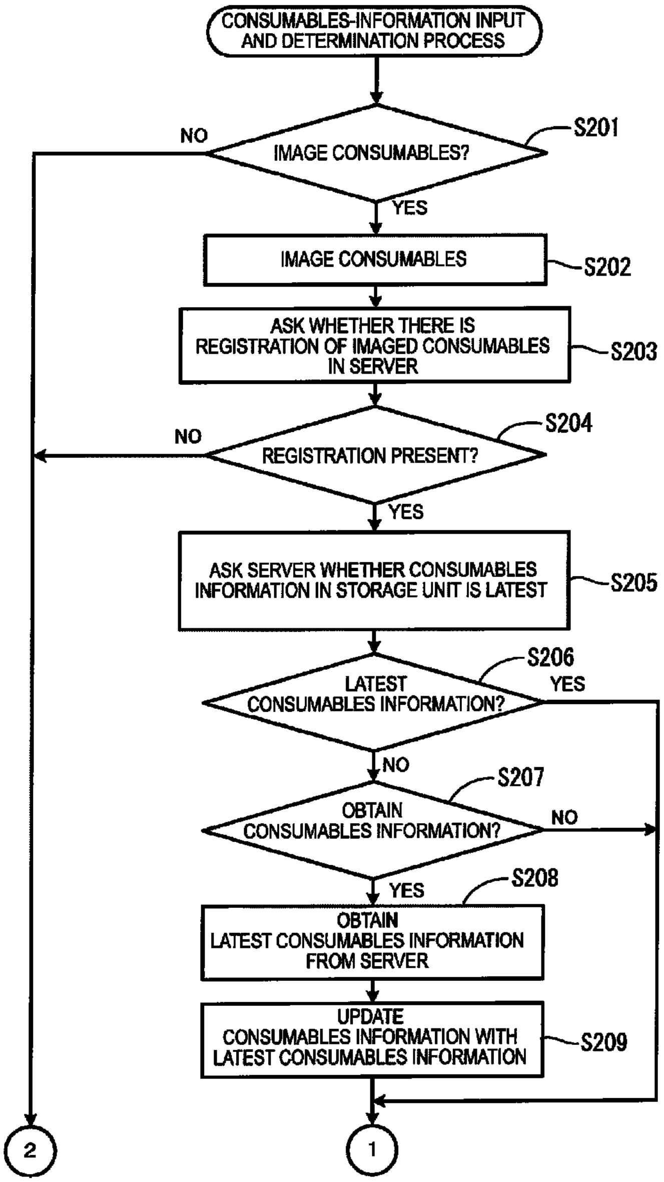
FIG. 5 is a part of a flowchart of a consumables-information input and determination process.
Figure 6:
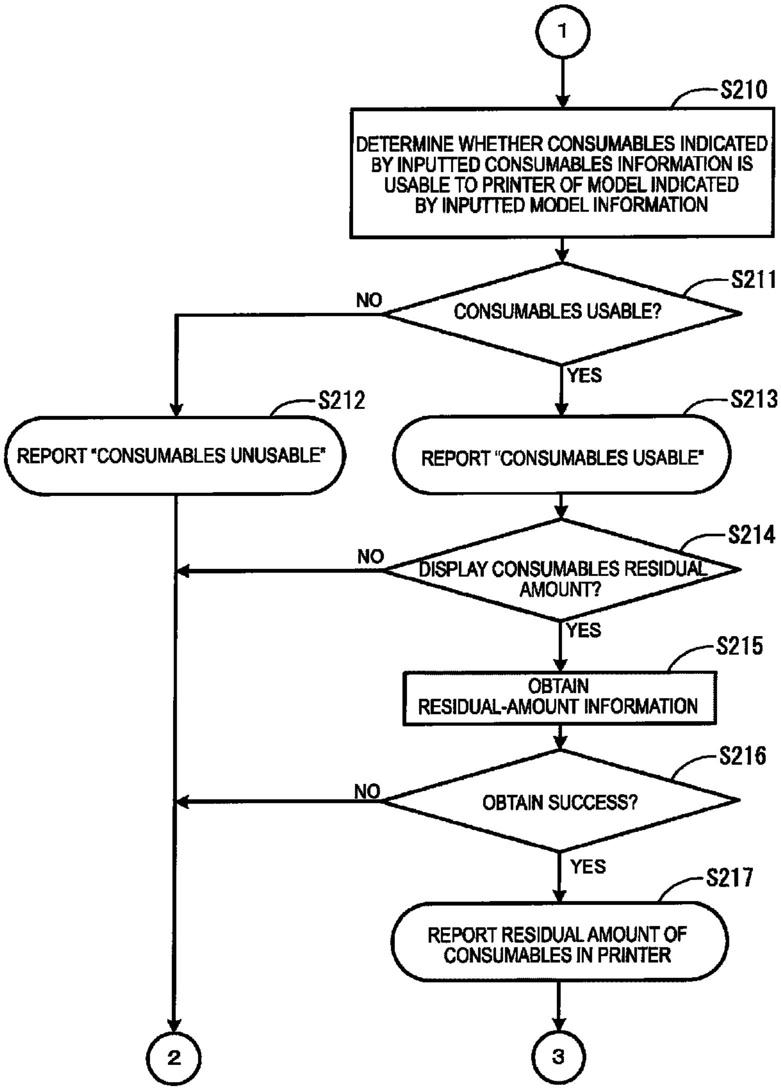
FIG. 6 is a part of the flowchart of the consumables-information input and determination process.
Figure 7:
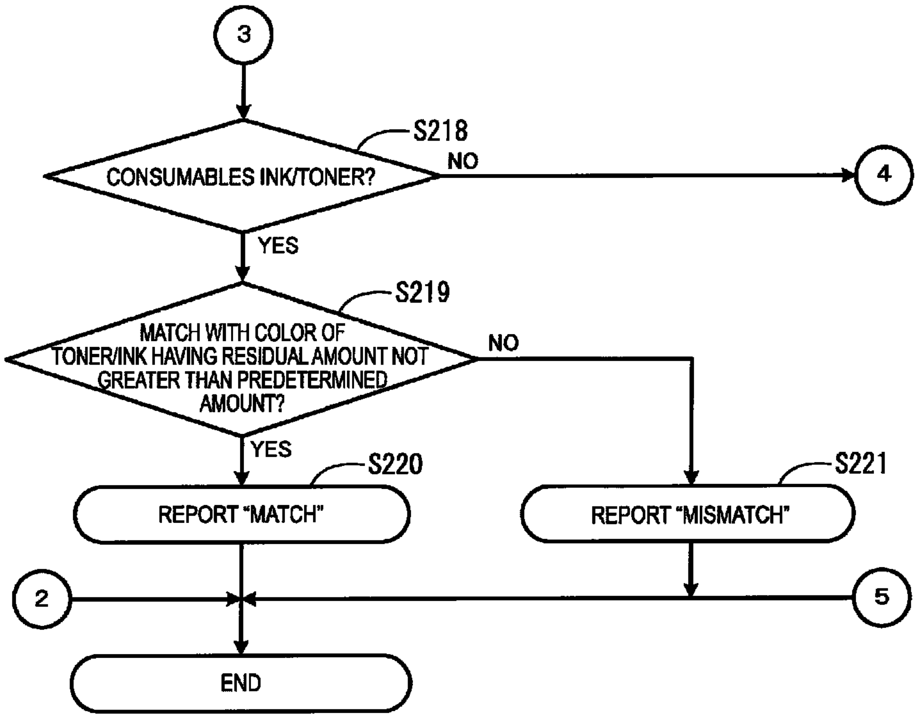
FIG. 7 is a part of the flowchart of the consumables-information input and determination process.
Figure 8:
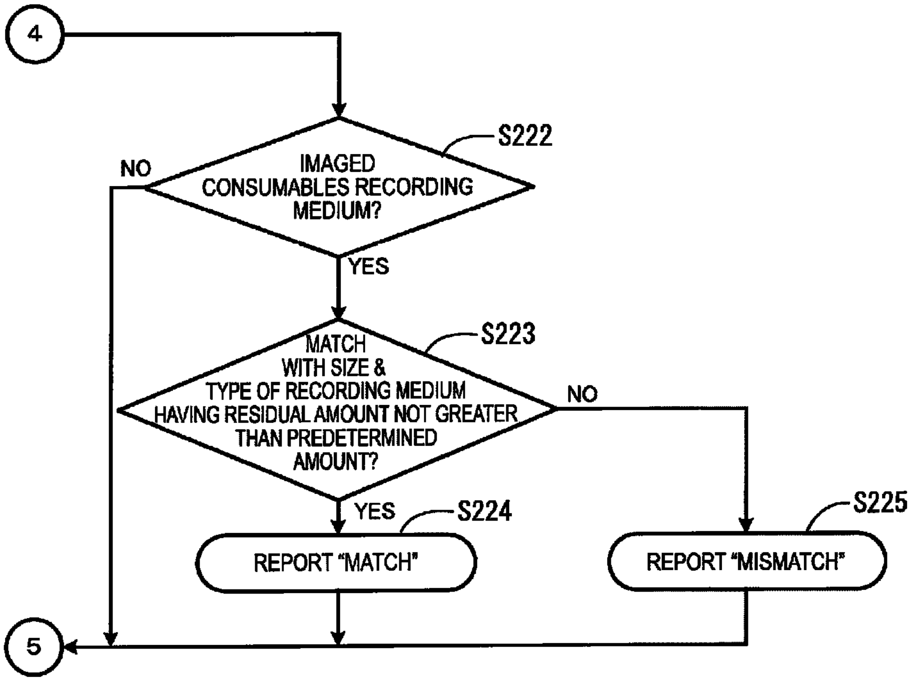
FIG. 8 is a part of the flowchart of the consumables-information input and determination process.

(3) Operation of Consumables-Usability Determination System (3-1) Model-Information Input Process A model-information input process, which is illustrated in FIG. 4, is a process of inputting the model information (indicating the model of the printer for which the user is going to replace the consumables) in the mobile phone 10. This process is executed at a place (such as an office or home) where the printer for which the consumables is being replaced is located.

In this illustrative aspect, the user inputs the model information by imaging the printer with the mobile phone 10.

The model-information input process is initiated on operation of the mobile phone 10 by the user at the above-described place so as to direct initiation of the process.

In S101, the mobile phone 10 asks the user whether to image the printer. If the user selects "YES", the process goes to S102. If the user selects "NO", the process is terminated.

In S102, the mobile phone 10 waits for the user to push the shutter button. Then, upon push of the shutter button, the mobile phone 10 images the printer and creates the digital image.

Imaged in this imaging is a portion whereby the model of the printer can be identified. For example, the portion may be either one of: a model name printed on the printer (because the model name is dedicated to the model of the printer); a logotype on the printer (if the logotype is dedicated to the model); the layout of the buttons in the operation unit 24 (if the layout is distinguishable from those of the other models); a front profile of the printer (if the front profile is distinguishable from those of the other models); and a bar code or QR code having the model information of the printer (if there is such a code on the printer).

However, allowing the user to unrestrictedly select the portion to image would make the pattern matching difficult. Therefore, in this illustrative aspect, the user is required to image the model name on the printer at a predetermined angle and with a predetermined distance.

In S103, the mobile phone 10 transmits the digital image to the server 20 and asks whether there is a registration of the model of the imaged printer in the server 20.

In the server 20, there are a stored image (pattern images) that represents the model name with respect to each model indicated by the model information registered in the server-side consumables table. On receipt of the digital image from the mobile phone 10, the server 20 scans the digital image with each of the pattern images so as to decide whether the pattern of the digital image matches that of one of the pattern images.

If the patterns match, the server 20 determines that there is the registration and then replies to the mobile phone 10. Contained in the reply is information indicating presence of the registration; and the model information about the model identified by the matched pattern. On the other hand, if the patterns mismatch, the server 20 determines that there is no registration and replies information indicating absence of the registration to the mobile phone 10.

In S104, the mobile phone 10 decides whether there is the registration of the model of the imaged printer in the server 20 on the basis of the information replied from the server 20. If there is no registration, the process goes to S105. If there is the registration, the process goes to S106.

In S105, the mobile phone 10 reports that there is no registration of the printer to the user and then terminates the process. This report can be performed by any section. For example: a message may be displayed in the display unit 16; or voice may be produced by the sound generator 14. The same is the reports described below.

In S106, the mobile phone 10 stores the model information obtained from the server 20 in the storage unit 18.

In S107, the mobile phone 10 transmits the model information stored in S106 to the server 20 and obtains the consumables information (with the information classification) about all consumables usable to the printer of the model indicated by the model information and the last update date of the consumables information from the server 20.

In S108, the mobile phone 10 registers the obtained consumables information (with the information classification) in the mobile-phone-side consumables table and, further, registers the obtained last update date in the storage unit 18.

In S109, the mobile phone 10 reports completion of input of the model information to the user.

(3-2) Consumables-Information Input and Determination Process

The consumables-information input and determination process, which is illustrated in FIGS. 5 through 8, is a process of: inputting the consumables information indicating consumables; determining whether the consumables indicated by the inputted consumables information is usable to the model indicated by the model information inputted by the model-information input process; and reporting the determination result to the user. The consumables-information input and determination process is executed at a place (such as a shop or a storehouse) where stock of the consumables is located.

In this illustrative aspect, the user inputs the consumables information by imaging the consumables with the mobile phone 10.

The consumables-information input and determination process is initiated on operation of the mobile phone 10 by the user at the above-described place so as to direct initiation of the process.

In S201, the mobile phone 10 asks the user whether to image the consumables. If the user selects "NO", the process is terminated. If the user selects "YES", the process goes to S202.

In S202, the mobile phone 10 waits for the user to push the shutter button. Then, upon push of the shutter button, the mobile phone 10 images the consumables and creates a digital image.

In this imaging, similar to the imaging of the printer, a portion whereby the consumables information of the consumables can be identified is imaged. For example, the portion may be either one of: an item number (or a string of characters indicating the size and type of material if the consumables is the recording medium) printed on the package of the consumables or on the consumables itself; the logotype dedicated to the consumables; and a bar code or QR code indicated by the consumables information (if there is such a code on the printer).

However, similar to the imaging of the printer, allowing the user to unrestrictedly select the portion to image would make pattern matching difficult. Therefore, in this illustrative aspect, the user is required to image the item number (or the string of characters indicating the size and type of material if the consumables is the recording medium).

In S203, the mobile phone 10 transmits the digital image to the server 20 and asks whether there is a registration of the imaged consumables in the server 20.

In S203, further, the server 20 performs pattern matching similar to S104 in FIG. 4. If the patterns match, the server 20 determines that there is the registration and replies to the mobile phone 10. Contained in the reply are: information indicating presence of the registration; and the consumables information about the consumables identified by the matched pattern (the item number (for ink or toner) or the string of characters indicating the size and type of material (for the recording medium)). On the other hand, if the patterns mismatch, the server 20 determines that there is no registration and replies information indicating absence of the registration to the mobile phone 10.

In S204, the mobile phone 10 decides whether there is a registration of the imaged consumables in the server 20 on the basis of the information replied from the server 20. If there is the registration, the process goes to S205. If there is no registration, the process is terminated.

In S205, the mobile phone 10 transmits the model information stored in S106 and the last update date stored in S108 to the server 20 and asks the server 20 whether the consumables information in the mobile-phone-side consumables table is the latest consumables information.

On receipt of the model information and the last update date, the server 20 reads out the last update date associated with the model information from the last update date table and compares the last update date received from the mobile phone 10 with the last update date read out from the last update date table. If the last update date received from the mobile phone 10 and the last update date read out is the same, the server 20 decides that the consumables information is the latest and replies information about that the consumables information is the latest to the mobile phone 10. On the other hand, if the last update date received from the mobile phone 10 is earlier than the last update date read out, the server 20 decides that the consumables information is not the latest and replies information about that the consumables information is not the latest to the mobile phone 10.

In S206, the mobile phone 10 decides on the basis of the information replied from the server 20 whether the consumables information registered in the mobile-phone-side consumables table is the latest one. If the consumables information is not the latest one, the process goes to S207; or, if the consumables information is the latest one, the process goes to S210.

In S207, the mobile phone 10 asks the user whether to obtain the latest consumables information. If the user selects "YES", the process goes to S208; or, if the user selects "NO", the process goes to S210.

In S208, the mobile phone 10 transmits the model information stored in the storage unit 18 to the server 20 and obtains the latest consumables information and the consumables information of the consumables usable to the model indicated by the model information and the last update date from the server 20.

Then, the mobile phone 10 deletes all records registered in the mobile-phone-side consumables table and registers the latest consumables information (with the information classification) received from the server 20. Thus, the consumables information is updated. In addition to this, the mobile phone 10 updates also the last update date in the storage unit 18 in a similar manner.

In S210, the mobile phone 10 determines whether the consumables indicated by the inputted consumables information is usable to the printer of the model indicated by the inputted model information. Specifically, the mobile phone 10 decides whether there is the registration in the mobile-phone-side consumables table of the consumables information (the item number (for the ink or toner) or the string of characters indicating the size and type of material (for the recording medium)) received from the server 20. If there is the registration, the mobile phone 10 determines that the consumables is usable; or, if there is no registration, the mobile phone 10 determines that it is unusable.

If the consumables is the recording medium, the mobile phone 10 determines that there is the registration only if both of the size and type of material match. For example, if the consumables information received from the server 20 is "A4, OHP", and there is the registration of A4 while there is no registration of OHP in the mobile-phone-side consumables table. Then, the mobile phone 10 determines that the recording medium is unusable.

In S211, if the determination result is that the consumables is unusable, the process goes to S212; or, if the determination result is that the consumables is usable, the process goes to S213.

In S212, the mobile phone 10 reports the consumables to be unusable to the user.

In S213, the mobile phone 10 reports the consumables to be usable to the user.

In S214, the mobile phone 10 asks the user whether to display the residual-amount information (indicating the residual amount of the consumables in the printer) in the display unit 16. If the user selects "YES", the process goes to S215; or, if the user selects "NO", the process is terminated.

In S215, the mobile phone 10 searches the storage unit 18 and reads out the residual information indicating the residual amount of the consumables in the printer that is imaged in S102. The residual-amount information is the information that mobile phone 10 obtains from the printer and stores in the storage unit 18 by a "residual-amount-information obtain process", which will be described below. Obtained by the residual-amount-information obtain process is: the consumables information (the item number (for ink or toner) or the size and type of material of the recording medium (for the recording medium)) of each consumables in the printer; and the residual-amount information (=[residual amount]/[amount before start of use]) indicating the residual amount of the consumables indicated by the consumables information. The residual-amount-information obtain process will be described below.

In S216, the mobile phone 10 decides whether the obtain of the residual-amount information has succeeded. If the obtain has succeeded, the process goes to S217. If the obtain has failed, the process is terminated. Specifically, the mobile phone 10 determines: whether there is the registration of the residual-amount information table in the storage unit 18; and, if there is the registration, whether the last obtain date of the residual-amount information table is within a predetermined time period (e.g. within one week) from the present time. If both determinations are positive, the process goes to S217. If either one is negative, the process is terminated.

In S217, the mobile phone 10 reports the residual amount of each consumables in the printer to the user.

In S218, the mobile phone 10 decides whether the consumables indicated by the inputted consumables information is ink or toner. Specifically, the mobile phone 10 obtains the information classification associated with the consumables information obtained from the server 20 and, if the obtained information classification is "Toner/ink", the mobile phone 10 decides the consumables to be the ink or toner. If the consumables is ink or toner, the process goes to S219; or, if the consumables is other than the ink or toner, the process goes to S222.

In S219, the mobile phone 10 decides whether the color of the ink or toner indicated by the inputted consumables information matches the color of one of the ink or toner which residual-amount information has been obtained in S215 and which residual amount is not greater than a predetermined amount (e.g. not greater than 10%). Specifically, the mobile phone 10 decides whether the consumables information obtained from the server 20 in S203 matches either one of the consumables information (which is included in the consumables information obtained from the residual-amount information table in S215) about the consumables which residual amount is not greater than the predetermined amount; and, if the two information match, the mobile phone 10 decides that the color matches the color of the ink or toner which residual amount is not greater than the predetermined amount. If the colors match, the process goes to S220; or, if the colors mismatch, the process goes to S221.

In S220, the mobile phone 10 reports that the colors match to the user.

In S221, the mobile phone 10 reports that the colors mismatch to the user.

In S222, the mobile phone 10 decides whether the consumables indicated by the inputted consumables information is the recording medium. Specifically, the mobile phone 10 reads out the information classification (which is associated with the consumables information obtained from the server 20 in S203) from the mobile-phone-side consumables table and, if the read-out information classification is the "Media Size" or the "Media Type", decides that the consumables is the recording medium. If the consumables is the recording medium, the process goes to S223; or, if the consumable is other than the recording medium, the process is terminated.

In S223, the mobile phone 10 decides whether the item type (the size and type of material) of the recording medium indicated by the inputted consumables information matches the item type (the size and type of material) of the recording medium which is one of the recording medium which residual-amount information has been obtained in S215 and which residual amount is not greater than the predetermined amount (e.g. not greater than 10%). If the item types match, the process goes to S224. If the item types mismatch, the process goes to S225.

In S224, the mobile phone 10 reports that the item types match to the user.

In S225, the mobile phone 10 reports that the item types mismatch to the user.

(3-3) Residual-Amount-Information Obtain Process

Figure 9:
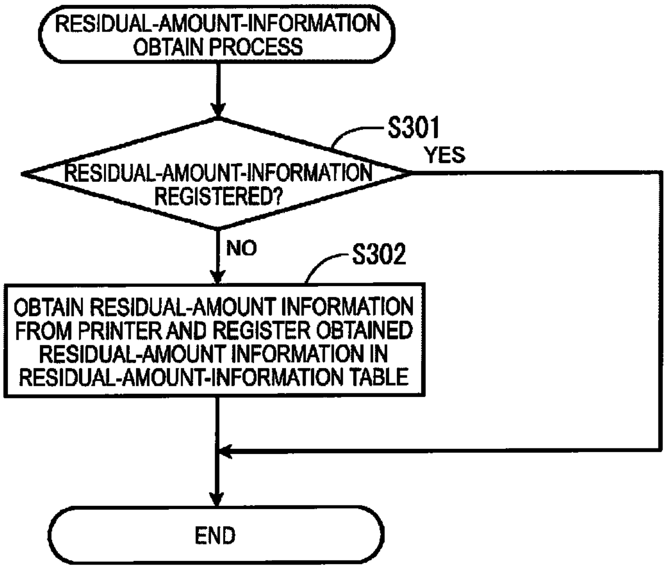
FIG. 9 is a flowchart of a residual-amount-information obtain process.

The residual-amount-information obtain process, which is illustrated in FIG. 9, is initiated on operation of the mobile phone 10 by the user so as to direct the initiation of the process. Note that the mobile phone 10 is operated in a state mutually communicable with the printer.

In S301, the mobile phone 10 decides whether there is the registration of the residual-amount information obtained from the status monitor of the printer in the residual-amount information table. If there is the registration but there is a blank period of a predetermined time or more after obtain of the residual-amount information, the registration is ignored. This is because the residual amount may have been changed during the blank period. If there is no registration of the residual-amount information, the process goes to S302. If there is the registration, the process is terminated.

In S302, the mobile phone 10 obtains information from the status monitor of the printer. The obtained information is: the consumables information about all consumables in the printer; and the residual-amount information indicating the residual amount of each consumables. Next, the mobile phone 10 registers the obtained information in the residual-amount information table and updates the last obtain date with the present date in the year-month-date format.

Note that the mobile phone 10 does not have to obtain the residual-amount information directly from the printer. The residual-amount information may be obtained in such a manner that the mobile phone 10 transmits a domain name or IP address of the printer with a requirement of the residual-amount information to the server 20 and, in response to the requirement, the server 20 obtains the residual-amount information from the printer.

(4) Effects of First Illustrative Aspect

With the consumables-usability determination system 1 as illustrated in the first illustrative aspect, the user does not have to take notes of the information about the consumables usable to the printer prior to going to the shop; instead, the user can obtain the information about the consumables usable to the printer by inputting the consumables information about the consumables possibly usable to the printer at the shop or store house. Therefore, the consumables-usability determination system 1 makes it possible to obtain the consumables usable to the printer without taking the notes of the consumables information about the consumables usable to the printer prior to going to the shop or store house.

Furthermore, the system 1 makes it possible to obtain the consumables information about the usable consumables from the server 20 so as to determine whether the consumables is usable to the printer.

Furthermore, with the system 1, inquiry of the server 20 whether the consumables information stored in the storage unit 18 is the latest consumables information is made on every input of the consumables information. Therefore, even if the consumables information is changed, the consumables information about the latest consumables usable to the printer can be obtained.

Furthermore, with the system 1, the determination whether the consumables determined to be usable and the consumables which residual amount indicated by the residual-amount information is not greater than the predetermined amount match is made, and the result of the determination is reported to the user. Even if the consumables is usable to the printer, if the residual amount of the consumables in the printer is greater than the predetermined amount, immediate replacing is unnecessary. With the system 1, because the result of determination is reported to the user, the user can easily determine whether to replace the consumables.

Furthermore, with the system 1, the determination whether the color agent determined to be usable and the color agent which residual amount indicated by the residual-amount information is not greater than the predetermined amount match is made, and the result of the determination is reported. This reduces the possibility for the user to purchase agent of a wrong color. Therefore, the user can surely purchase the color agent which residual amount is less.

Furthermore, with the system 1, the determination whether the item type (the size and type of material) of the recording medium determined to be usable and the item type of the recording medium which residual amount indicated by the residual-amount information is not greater than the predetermined amount match is made, and the result of the determination is reported. This reduces the possibility for the user to purchase a recording medium of a wrong item type. Therefore, the user can surely purchase the recording medium which residual amount is less.

<Second Illustrative Aspect>

A second illustrative aspect will be described with reference to FIGS. 10 and 11.

In this illustrative aspect, the server 20, not the mobile phone 10, determines whether the consumables indicated by the consumables information inputted by the consumables-information input process is usable to the model indicated by the model information inputted by the model-information input process.

The steps substantially identical to those of the first illustrative aspect will be designated by the identical reference characters, while the description will be omitted.

Figure 10:
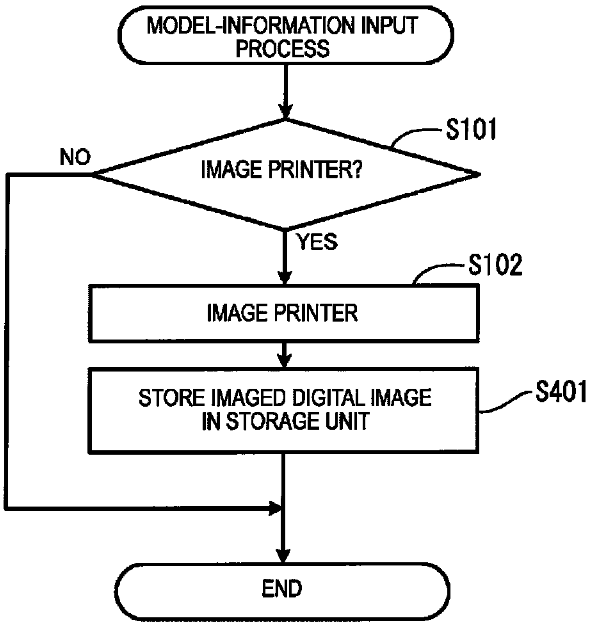
FIG. 10 is a flowchart of a model-information input process of a second illustrative aspect.

In S401 in FIG. 10, the mobile phone 10 stores the created digital image in the storage unit 18.

Figure 11:
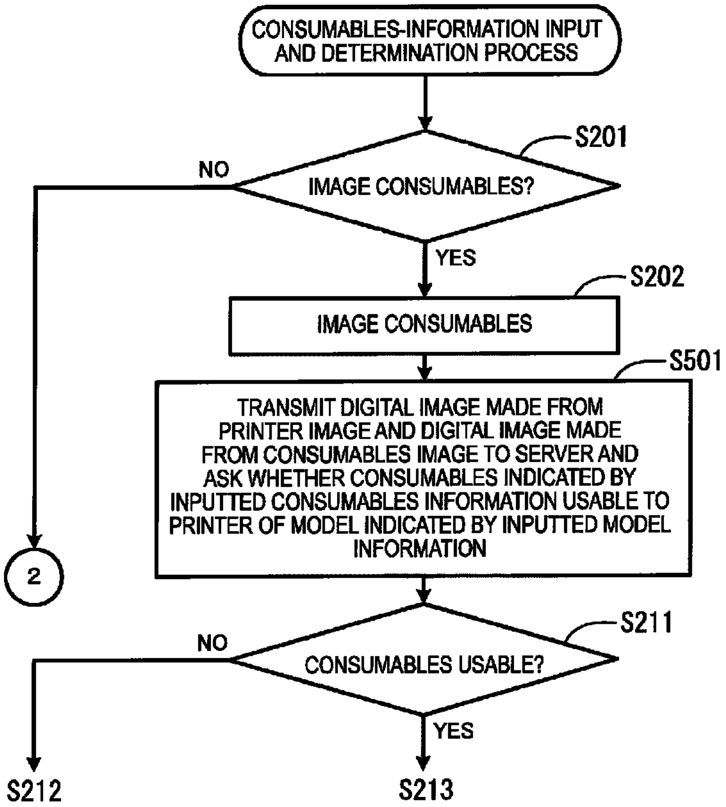
FIG. 11 is a flowchart of a part of a flowchart of the consumables-information input and determination process of the second illustrative aspect.

FIG. 11 is an illustrative part of the model-information input and determination process, which is not included in the consumables-information input and determination process of the first illustrative aspect. The other part is the same with the process illustrated in FIGS. 5 through 8. The steps that are substantially identical with those of the first illustrative aspect will be designated with the same reference characters, while the description will be omitted.

In S501, the mobile phone 10 transmits the digital image created by imaging the printer and the digital image created by imaging the consumables to the server 20 and asks the server 20 whether the imaged consumables is usable to the imaged printer.

Then, based on the digital image created by imaging the printer and the digital image created by imaging the consumables, the server 20 identifies the model and the consumables. If the identified consumables is usable to the identified model, the server 20 replies the information about that the consumables is usable to the model to the mobile phone 10. On the other hand, if the server 20 fails to identify at least one of the model and the consumables, or if the identified consumables is unusable to the identified model, the server 20 replies the information about that the consumables is not usable to the model to the mobile phone 10.

The consumables-usability determination program of this illustrative aspect makes it possible to determine whether the consumables is usable to the printer by transmitting the model information and the consumables information to the server 20 and asking so.

<Other Illustrative Aspects>

The present invention is not limited to the illustrative aspects described above with reference to the drawings. For example, the following illustrative aspects are also included within the scope of the present invention.

(1) In the above illustrative aspects, the mobile phone 10 with the digital camera is illustrated as the portable terminal The portable terminal may be a handheld terminal or a digital still camera.

(2) In the above illustrative aspects, the model information and the consumables information are inputted by imaging the printer and the consumables. The model information and the consumables information may be inputted by any other section. For example, the operation unit 17 may be used so that the user operates the operation unit 17 to directly input a string of characters indicating the printer model and a string of characters indicating the consumables. In this case, the digital camera (the imaging unit 15) of the portable terminal is unnecessary.

(3) In the above illustrative aspects, the consumables are the ink, the toner, and the recording medium. The consumables may be any one used with the image forming apparatus. For example, the consumables may be a photosensitive drum.

In the above illustrative aspects, the server 20 itself performs the steps of identifying the consumables information (S203) on the basis of the digital image created by imaging the consumables. This step may be performed by the mobile phone 10 itself.

What is claimed is:

1. A non-transitory computer readable medium storing computer executable instructions that, when executed by a processor, cause a portable terminal to:
- capture an image of at least a part of an image forming apparatus;
- transmit image data containing the captured image to a network server that stores model information and image patterns indicating models of image forming apparatuses and consumables information indicating consumables in association with the models of the image forming apparatuses;
- receive consumables information indicating consumables stored in the network server in association with a model of the image forming apparatus identified based on the image data by pattern matching by the network server the transmitted image data from the stored image patterns;
- store the consumables information in a storage unit of the portable terminal;
- receive an input from a user related to consumables information indicating a consumable for verification;
- determine whether the stored consumables information in the storage unit includes the consumable for verification; and
- determine whether the consumables indicated by the consumables information is usable with the model when the received consumables information matches the stored consumables information.

2. The non-transitory computer readable medium according to claim 1, wherein the at least a part of an image forming apparatus includes model information indicating a model of the image forming apparatus.

3. The non-transitory computer readable medium according to claim 1, wherein the computer readable medium stores additional computer executable instructions that, when executed by the processor, further cause the portable terminal to:
- capture an image of at least a part of the consumable for verification according to the input from the user;
- transmit image data containing the captured image of the at least a part of the consumable for verification to the network server;
- transmit a query to the network server to determine whether the consumables information related to the consumable identified based on the image data and stored in the storage unit is the latest; and
- when the consumables information stored in the storage unit is not the latest,
  - receive the latest consumables information from the network server; and
  - update the consumables information stored in the storage unit with the latest consumables information.

4. The non-transitory computer readable medium according to claim 1, wherein the computer readable medium stores additional computer executable instructions that, when executed by the processor, further cause the portable terminal to:
- transmit a query to the network server to determine whether the consumables indicated by the consumables information from the user is usable with the model indicated by the model information transmitted to the network server; and
- receive a reply to the query indicating whether the consumable is usable with the model from the network server.

5. The non-transitory computer readable medium according to claim 1, wherein the computer readable medium stores additional computer executable instructions that, when executed by the processor, further cause the portable terminal to:
- receive residual-amount information indicating a residual amount of a consumable, which is installed in the image forming apparatus, from the image forming apparatus;
- determine whether the consumables having the residual amount indicated by the residual-amount information as equal to or lower than a predetermined amount matches the consumable determined to be usable with the model; and report a result of the determination to the user.

6. The non-transitory computer readable medium according to claim 5, wherein the consumables installed consumable in the image forming apparatus is a coloring agent.

7. The non-transitory computer readable medium according to claim 5, wherein:

the consumable in the image forming apparatus is recording media; and the computer readable medium stores additional computer executable instructions that, when executed by the processor, further cause the portable terminal to determine whether a type of the consumable having the residual amount indicated by the residual-amount information as equal to or lower than a predetermined amount matches a type of the consumable determined to be usable with the model.

8. A consumables determination system for determining whether a consumable is usable with an image forming apparatus comprising:

a network server including:

a storage unit configured to store model information and image patterns indicating models of image forming apparatuses and consumables information indicating consumables in association with the models of the image forming apparatuses;

a controller configured to:

match a model of the image forming apparatus from an identified image pattern based on data transmitted by a portable terminal;

identify the model of the image forming apparatus;

determine whether the consumables information stored in the storage unit includes a consumable associated with the identified model; and transmit the consumables information to the portable terminal when the consumables information includes the consumable associated with the identified model; and the portable terminal including:

an imaging unit configured to capture an image of at least a part of the image forming apparatus and an image of at least a part of the consumable;

a transmitter-receiver configured to receive the consumables information from the network server;

a storage unit configured to store the consumables information received by the transmitter-receiver;

a controller configured to:

identify the consumable based on the image captured by the imaging unit;

determine whether the stored consumables information in the storage unit includes the identified consumable; and determine that the consumable is usable with the model when the stored consumables information includes the identified consumable; and a display unit configured to display a result of the determination indicating whether the consumable is usable with the model.

9. A consumables determination system for determining whether a consumable is usable with an image forming apparatus comprising:

a portable terminal including:

an imaging unit configured to capture an image of at least a part of the image forming apparatus and an image of at least a part of the consumable;

a transmitter-receiver configured to:

transmit image data containing the captured image of the at least a part of the image forming apparatus and the captured image of the at least a part of the consumable to a network server that stores model information indicating models of image forming apparatuses and consumables information indicating consumables in association with the models of the image forming apparatuses; and receive a result of a determination indicating whether a consumable identified based on the image data of the at least a part of the consumable is usable with a model identified based on the image data of the at least a part of the consumable from the network server; and a display configured to display the result of the determination; and the network server including:

a storage unit configured to store model information indicating models of image forming apparatuses and consumables information indicating consumables in association with the models;

a controller configured to:

match a model of the image forming apparatus from an identified image pattern based on at least a part of the image forming apparatus transmitted by the portable terminal;

identify the model of the image forming apparatus;

identify a consumable that is requested for verification based on image data of the at least a part of the consumable transmitted by the portable terminal;

determine whether the consumables information stored in association with the identified model includes the identified consumable;

determine that the identified consumable is usable with the identified model when the stored consumables information includes the identified consumable; and transmit a result of the determination indicating that the consumable is usable with the model to the portable terminal.

10. A method of acquiring consumables information indicating a consumable usable with an image forming apparatus by a portable terminal from a network server, the method comprising:

storing model information and image patterns indicating models of image forming apparatuses and consumables information indicating consumables in association with the models of the image forming apparatuses in the network server;

capturing an image of at least a part of the image forming apparatus by the portable terminal;

transmitting image data containing the captured image of the at least a part of the image forming apparatus from the portable terminal to the network server;

matching an identified image pattern of at least part of image forming apparatus from the transmitted image data by matching the identified image pattern from the stored image patterns;

identifying from the matching a model of the image forming apparatus;

transmitting consumables information indicating a consumable associated with the identified model from the network server to the portable terminal;

storing the consumables information in the portable terminal;

capturing an image of at least a part of a consumable by the portable terminal, the consumable being requested for verification;

transmitting image data containing the captured image of the at least a part of the consumable from the portable terminal to the network server;

identifying the consumable based on the transmitted image data of the at least a part of the consumable;

determining whether the stored consumables information in the network server includes the identified consumable;

determining whether the identified consumable is usable with the model when the stored consumables information in the network server includes the identified consumable; and transmitting consumables information related to the identified consumable from the network server to the portable terminal.

11. The method according to claim 10, wherein the at least a part of an image forming apparatus includes model information indicating a model of the image forming apparatus.

12. The method according to claim 10, further comprising:

determining whether the consumables information stored in the portable terminal is the latest; and transmitting the latest consumables information from the network server to the portable terminal when the consumables information stored in the portable terminal is not the latest.

13. The method according to claim 10, wherein the determination of whether the identified consumable is usable with the model is performed by the network server before transmitting the consumable information to the portable terminal.

14. The method according to claim 10, further comprising receiving residual-amount information indicating a residual amount of the consumable from the image forming apparatus;

determining whether the consumable having the residual amount indicated by the residual-amount information as equal to or lower than a predetermined amount matches the consumable determined to be usable with the model; and reporting a result of the determination.

15. The method according to claim 14, wherein the consumable in the image forming apparatus is a coloring agent.

16. The method according to claim 14, wherein the consumable is a recording medium, and the method further comprises determining whether a type of recording medium matches a type of the consumables determined to be usable with the model.

* * * * *

UNITED STATES PATENT AND TRADEMARK OFFICE

CERTIFICATE OF CORRECTION

PATENT NO. : 8,775,278 B2
APPLICATION NO. : 12/968568
DATED : July 8, 2014
INVENTOR(S) : Ryoko Tarao It is certified that error appears in the above-identified patent and that said Letters Patent is hereby corrected as shown below:

Claims

In Column 13, Claim 6, Line 7:
Please delete "consumables installed consumable" and insert --consumable--

In Column 16, Claim 14, Line 5:
Please delete "comprising" and insert --comprising:--

Signed and Sealed this
Twenty-eighth Day of June, 2016

Michelle K. Lee

Michelle K. Lee
*Director of the United States Patent and Trademark Office*